United States Patent
Manley et al.

(10) Patent No.: US 9,525,846 B2
(45) Date of Patent: *Dec. 20, 2016

(54) METHOD AND APPARATUS FOR NEGOTIATING VIDEO CAMERA AND DISPLAY CAPABILITIES IN A VIDEO CONFERENCING ENVIRONMENT

(71) Applicant: ClearOne Communications Hong Kong Ltd., Causeway Bay Hong Kong (HK)

(72) Inventors: Peter H. Manley, Draper, UT (US); Sandeep Kalra, Salt Lake City, UT (US); Derek L. Graham, South Jordan, UT (US); Avishay Ben Natan, Hod Hasharon (IL)

(73) Assignee: ClearOne Communications Hong Kong Ltd., Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,799

(22) Filed: Feb. 9, 2016

(65) Prior Publication Data

US 2016/0269680 A1 Sep. 15, 2016

Related U.S. Application Data

(63) Continuation of application No. 14/496,191, filed on Sep. 25, 2014, now Pat. No. 9,264,668.

(60) Provisional application No. 61/883,639, filed on Sep. 27, 2013.

(51) Int. Cl.
*H04N 7/14* (2006.01)
*H04N 7/15* (2006.01)
*H04L 29/06* (2006.01)

(52) U.S. Cl.
CPC ............ *H04N 7/147* (2013.01); *H04L 65/601* (2013.01); *H04N 7/15* (2013.01); *H04L 65/403* (2013.01)

(58) Field of Classification Search
CPC ........................................................ H04N 7/14
USPC ......... 348/14.01, 14.05, 14.12, 14.08, 14.09, 348/14.07
See application file for complete search history.

(56) References Cited

U.S. PATENT DOCUMENTS

| 9,264,668 B2 | 2/2016 | Manley et al. |
| 2012/0200658 A1 | 8/2012 | Duckworth et al. |
| 2014/0063176 A1 | 3/2014 | Modai et al. |
| 2015/0092008 A1 | 4/2015 | Manley et al. |

*Primary Examiner* — Olisa Anwah
(74) *Attorney, Agent, or Firm* — Matthew J. Booth & Associates PLLC; Matthew J. Booth (57) ABSTRACT

This disclosure describes a system for negotiating video camera and display capabilities in a video conferencing environment. The system includes a local camera; a local communication device; and a session negotiation device where the session negotiation device further comprises a processor, memory, and a storage. The processor executes a sequence of computer programmable software instructions that further includes determining negotiation information associated with the local camera; defining the determined negotiation information in a predetermined format compatible with the remote display; applying the determined negotiation information for negotiating capability of the local camera and the remote display for data communication; sending the determined negotiation information to the remote display; mapping data streams from the local camera to the remote display using the determined negotiation information; and defining a predetermined layout of the mapped data streams on the remote display based on the determined negotiation information.

20 Claims, 6 Drawing Sheets

METHOD AND APPARATUS FOR NEGOTIATING VIDEO CAMERA AND DISPLAY CAPABILITIES IN A VIDEO CONFERENCING ENVIRONMENT

CROSS REFERENCE TO RELATED APPLICATIONS

This application claims priority and the benefits of the earlier filed Provisional U.S. Application No. 61/883,639, filed 27 Sep. 2013, which is incorporated by reference for all purposes into this specification.

Additionally, this application is a continuation of U.S. application Ser. No. 14/496,191, filed 25 Sep. 2014, which is incorporated by reference for all purposes into this specification.

TECHNICAL FIELD

The present disclosure relates to video conferencing systems. More particularly, the present disclosure relates to a system for negotiating video camera and display capabilities in a video conferencing environment.

BACKGROUND ART

Various types of communication systems may be employed for conducting a video conferencing session. Such communication systems may be associated with multiple cameras or screens. Typically, such multi-camera or multi-screen communication systems employ a group of video conferencing end-points (VC end-point), each of which being connected to one or more screens and can send one or more video streams. This combination of video streams generally comprises a live video, which may be captured with a high resolution video camera, and a presentation or pre-recorded video captured from a program source, such as a PC, a memory storage card, or a Blu-ray player.

Often, a source VC end-point and associated devices (for example, display devices, cameras, servers, etc.) negotiate their communication capabilities (for example, mutually compatible media types, formats, resolutions, protocols, etc.) with those of the destination VC end-point and associated devices. Such communication session typically involves session announcement, session invitation, and parameter negotiation. The set of properties and parameters that define the communication capabilities of a VC end-point are referred to as the session profile.

Traditionally, communication capabilities are mapped manually between the end-points in a local room and the end-points in a remote room for configuring a connection between their respective multi-camera or multi-display systems. For initiating a connection between the end-points, each of the multi-camera systems (or multi-display systems) is typically connected to a master controller that instructs a source end-point to connect with a pre-configured destination end-point. Hence, the existing approach requires an administrator to pre-configure this mapping manually and requires the administrator to have prior knowledge of how the remote system is configured.

SUMMARY OF INVENTION

This disclosure describes a system for negotiating video camera and display capabilities in a video conferencing environment. The system includes a local camera capturing a data stream upon being active; a local communication device in communication with the local camera and the remote display; and a session negotiation device in communication with the communication device, where the session negotiation device further comprises a processor, memory, and storage. The processor executes a sequence of software instructions that further includes determining negotiation information associated with the local camera, wherein the determined negotiation information comprises relative spatial information and data stream characteristics; defining the determined negotiation information in a predetermined format compatible with the remote display; applying the determined negotiation information for negotiating capabilities of the local camera and the remote display for data communication; sending the determined negotiation information to the remote display; mapping data streams from the local camera to the remote display using the determined negotiation information; and defining a predetermined layout of the mapped data streams on the remote display based on the determined negotiation information.

In addition, the system further provides that the determined negotiation information is defined as one or more predetermined media attributes in a session description protocol format wherein the predetermined media attributes further includes: a first port identifier associated with the data stream and a parameter that defines relative position of the local camera providing the data stream; and a second port identifier associated with the data stream, a type identifier for the data stream, and a parameter providing the description of the data stream.

The system further provides that the data stream is a video data stream.

In addition, the system provides the relative spatial information including a spatial position and orientation.

Additionally, the system provides that the data stream characteristics include one or more media types, transport protocols, formats, and associated media ports.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

The present disclosure describes a system for negotiating video camera and display capabilities in a video conferencing environment. The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative hardware includes logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory. A processor may also be implemented as a combination of computing devices, such as a combination of a DSP and a microprocessor, a plurality of microprocessors, one or more microprocessors in conjunction with a DSP core, or any other such configuration.

In addition, the disclosed embodiments may be software or programs such as computer readable instructions that may be described in terms of a process that may be depicted as a flowchart, a flow diagram, a structure diagram, or a block diagram. The process may describe operational acts as a sequential process, many of these acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors.

Figure 3:
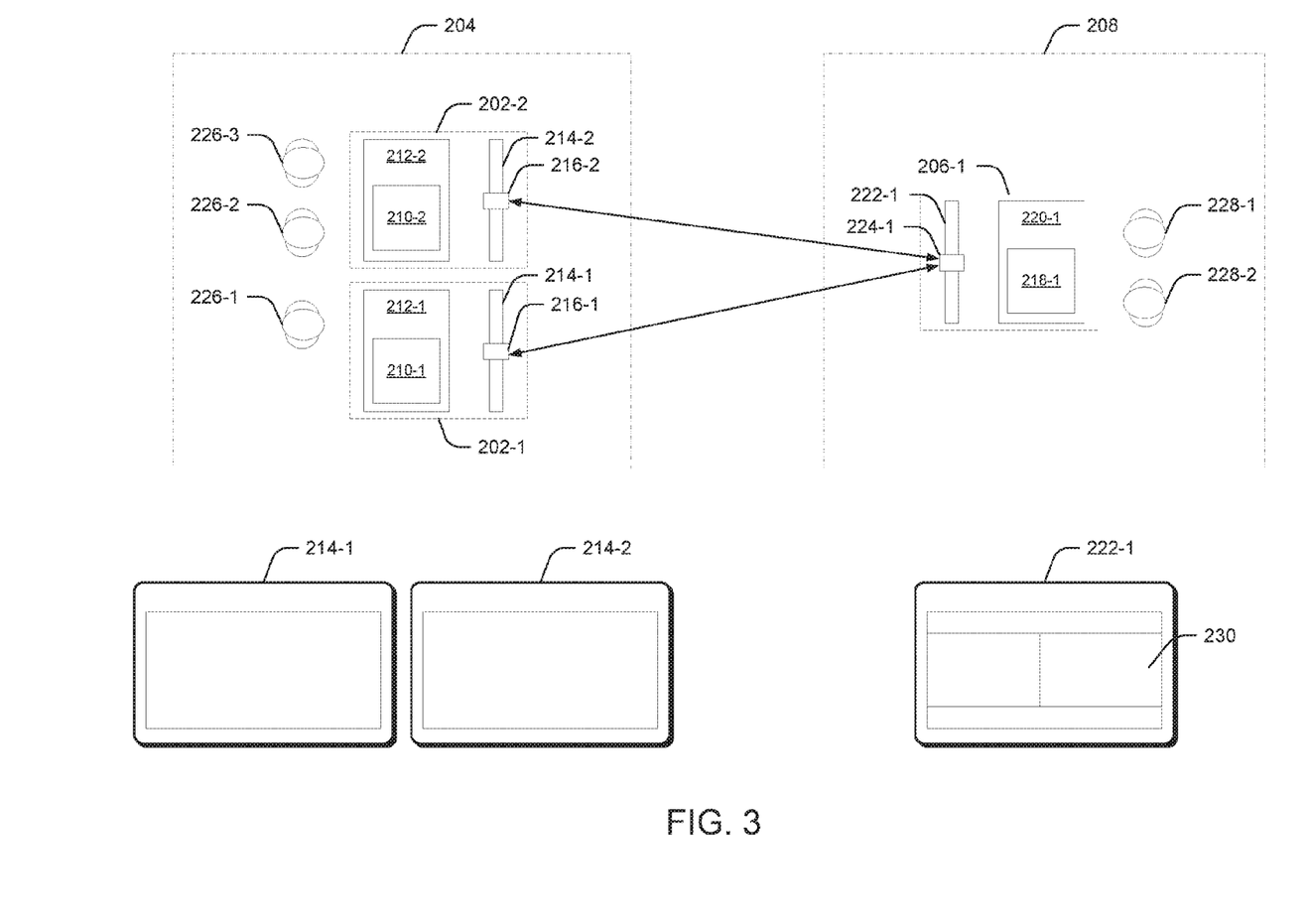
FIG. 3 a schematic that illustrates the mapping of data streams from one location to another location where each of the locations may have different combinations of resources and in which multiple source videos are mapped into a side-by-side image on a single display at the receiver.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

Figure 1A:
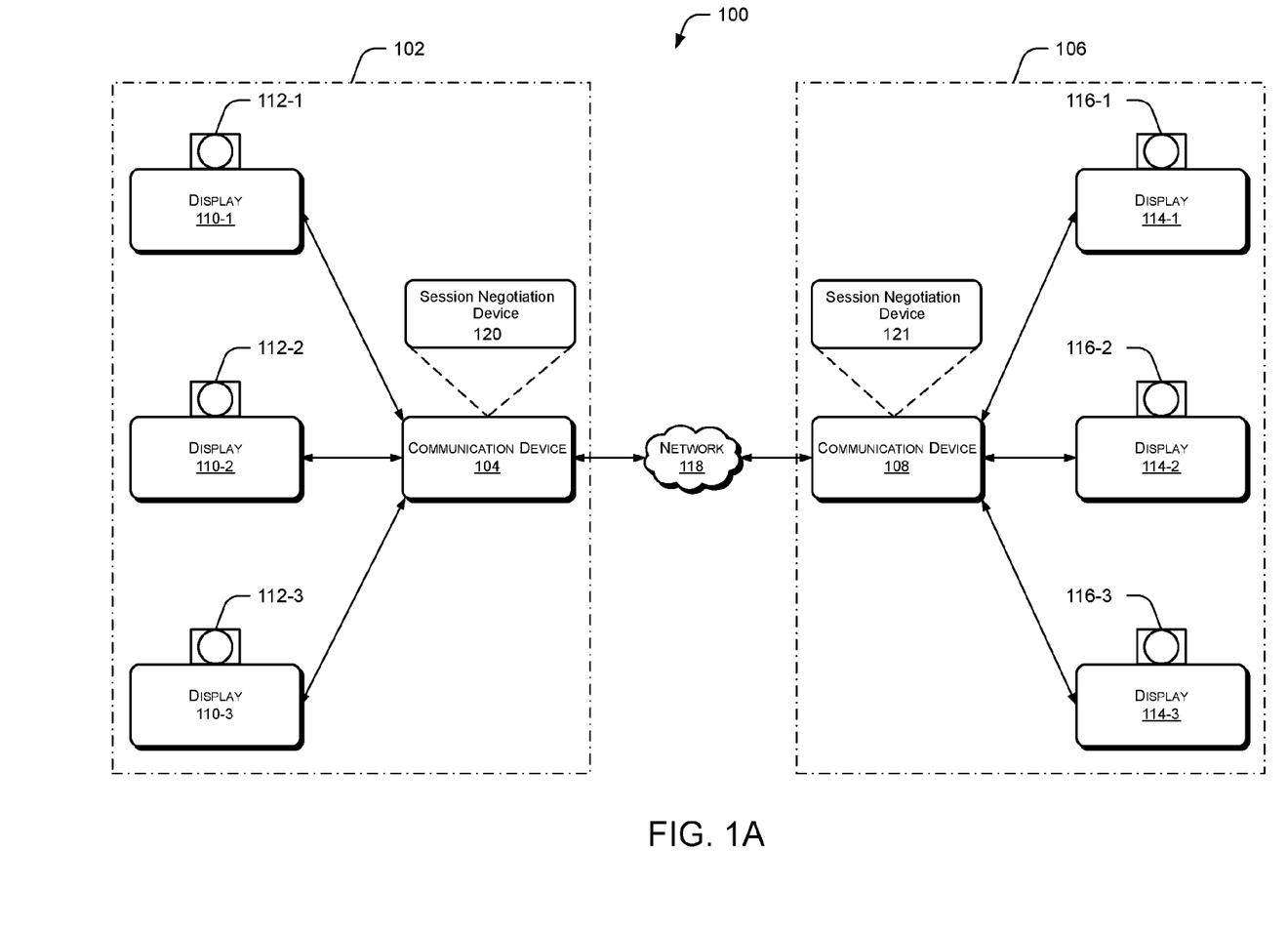
FIG. 1A is a schematic that illustrates a first network environment that includes a session negotiation device.

FIG. 1A is a schematic that illustrates a network environment that includes a session negotiation device according to an embodiment of the present disclosure that may include a network environment 100 (for example, video conferencing, video broadcast, etc.) involving communications between different communication devices (for example, video conferencing systems, etc.) remotely located from each other.

The network environment 100 may include a first location 102 having a communication device 104 and a second location 106 having a communication device 108. The communication device 104 may be coupled to multiple displays 110-1, 110-2, 110-3 (collectively, displays 110), which may be coupled to cameras 112-1, 112-2, 112-3 (collectively, cameras 112) respectively. Similarly, the communication device 108 may be coupled to multiple displays 114-1, 114-2, 114-3 (collectively, displays 114), which may be coupled to cameras 116-1, 116-2, 116-3 (collectively, cameras 116) respectively. One skilled in the art will appreciate that cameras 112 or 116 may not be attached to the communication devices 104 or 108 such that those devices are in a display only mode.

The communication device 104 and/or 108 may be implemented as any of a variety of computing devices (for example, a server, a desktop PC, a notebook, a workstation, a personal digital assistant (PDA), a mainframe computer, a mobile computing device, an internet appliance, etc.) and calling devices (for example, a telephone, an internet phone, a cell phone, a smart phone, etc.).

The communication device 104 may communicate with the communication device 108 over a network 118, which may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 118 may include multiple networks or sub-networks, each of which may include, for example, a wired or wireless data pathway. The network 118 may include a circuit-switched voice network, a packet-switched data network, or any other network able to carry electronic communications. For example, the network 118 may include networks based on the Internet protocol (IP) or asynchronous transfer mode (ATM), and may support voice using, for example, VoIP, Voice-over-ATM, or other comparable protocols used for voice data communications. Other embodiments may involve the network 118 including a cellular telephone network configured to enable exchange of text or multimedia messages.

FIG. 1A illustrates an embodiment 100 where the communication device 104 and 108 may include a session negotiation device 120 and/or 121 configured to augment media negotiation protocols by implementing a negotiated device topology and automate mapping of data streams associated with local devices, such as, the cameras 112, to remote devices, such as the displays 114.

The session negotiation device 120, 121 may represent any of a wide variety of devices capable of providing session negotiation and characterization, and media definition services for the network devices. The session negotiation device 120 may be implemented as a standalone and dedicated "black box" including hardware and installed software, where the hardware is closely matched to the requirements and/or functionality of the software. Alternatively, the session negotiation device 120 may be implemented as a software application or a device driver. The session negotiation device 120 may enhance or increase the functionality and/or capacity of the network, such as the network 118, to which it is connected. In some embodiments, the session negotiation device 120, 121 may be configured, for example, to perform e-mail tasks, security tasks, network management tasks including IP address management, and other tasks. In some other embodiments, the session negotiation device 120, 121 may be configured to expose its computing environment or operating code to a user, and may include related art I/O devices, such as a keyboard or display. The session negotiation device 120, 121 of some embodiments may, however, include software, firmware, or other resources that support remote administration and/or maintenance of the device.

The session negotiation device 120, 121 may be implemented as a single device (for example, a computing device or a portable storage device) or a combination of multiple devices. The session negotiation device 120, 121 may be implemented in hardware or a suitable combination of hardware and software. In some embodiments, the session negotiation device 120, 121 may be a hardware device including a processor (not shown) executing machine readable program instructions for establishing a communication channel between the cameras 112 and the remotely located displays 114.

In some embodiments, the session negotiation device 120, 121 may include, in whole or in part, a software application working alone or in conjunction with one or more hardware resources. Such software applications may be executed by the processor on different hardware platforms or emulated in a virtual environment. Aspects of the session negotiation device 120, 121 may leverage known, related art, or later developed off-the-shelf software.

In other embodiments, the session negotiation device 120, 121 may be integrated or in communication with a mobile switching center, network gateway system, Internet access node, application server, IMS core, service node, or some other communication systems, including any combination thereof. In some embodiments, the session negotiation device 120, 121 may be integrated with or implemented as a wearable device including, but not limited to, a fashion accessory (for example, a wrist band, a ring, etc.), a utility device (a hand-held baton, a pen, an umbrella, a watch, etc.), a body clothing, or any combination thereof.

In some embodiments, the session negotiation device 120 may be configured to convert communications, which may include instructions, queries, data, etc., from the communication device 104 into appropriate formats to make these communications compatible with the communication device 108. Consequently, the session negotiation device 120 may allow implementation of the communication device 108 using different technologies or by different organizations, e.g., a third-party vendor, managing the communication device 108 using a proprietary technology.

Figure 1B:
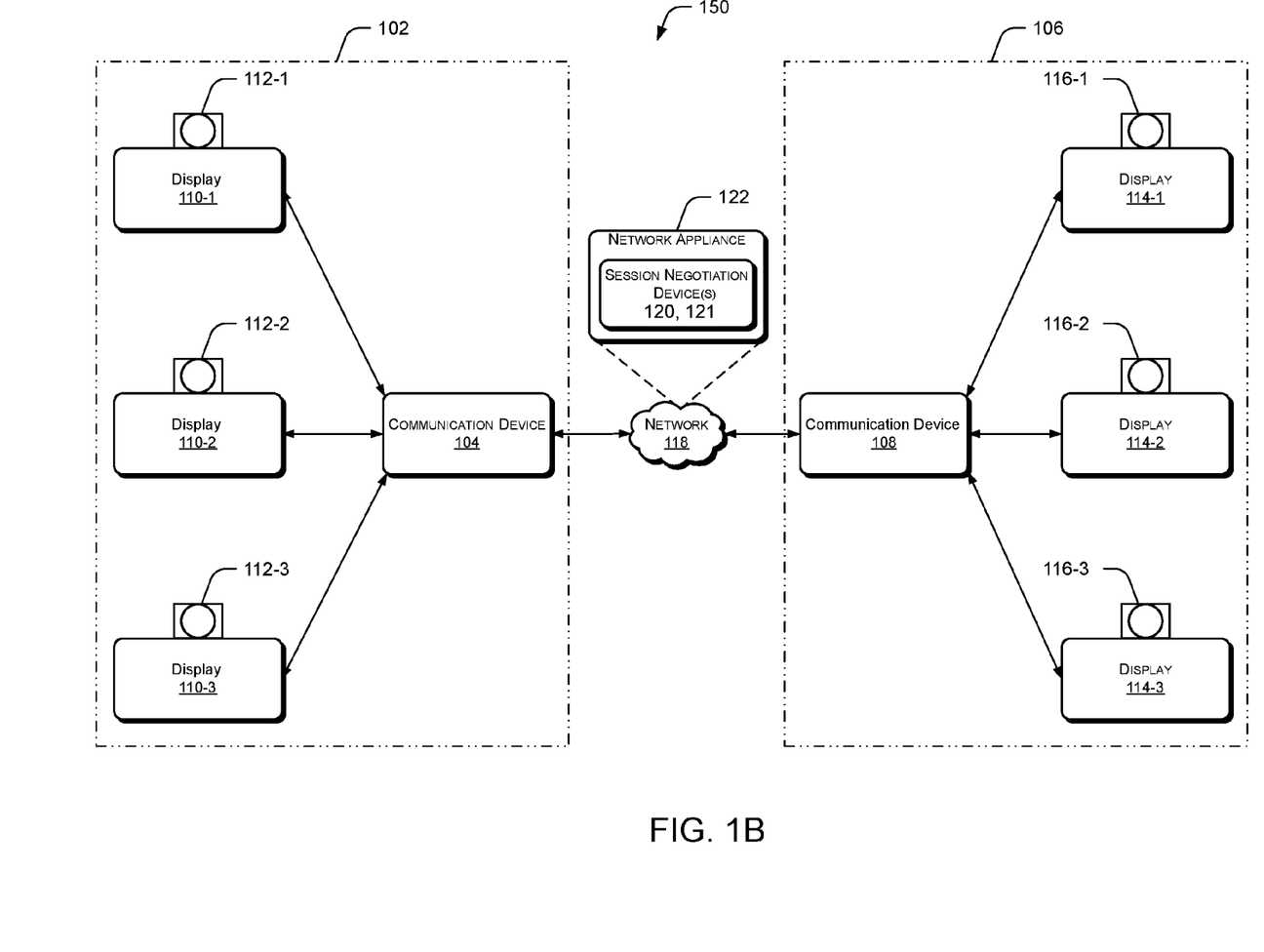
FIG. 1B is a schematic that illustrates a second network environment.

FIG. 1B illustrates another embodiment 150 where the session negotiation device 120, 121 may be installed on or integrated with a network appliance 122 that is configured to establish the network 118 between the communication device 104 and the communication device 108. The session negotiation device 120, 121 and the network appliance 122 may be capable of operating as or providing an interface to assist exchange of software instructions and data among the communication device 104, the communication device 108, and the session negotiation devices 120, 121. Embodiment 150 illustrates a separate session negotiation device that is in communication with an individual communication device. One skilled in the art will appreciate that one may use a single negotiation device to handle both sides of the communication session (i.e., session negotiation device 120 and 121 are a single unit).

In some embodiments, the network appliance 122 may be preconfigured or dynamically configured to include the session negotiation device 120, 121 integrated with other devices. For example, the session negotiation device 120, 121 may be integrated with any networked device such as the communication device 104, 106 connected to the network 118. The communication device 104 may include a module (not shown), which may enable the session negotiation device 120 being introduced to the network appliance 122, thereby enabling the network appliance 122 to invoke the session negotiation device 120 as a service. Examples of the network appliance 122 may include, but are not limited to, a DSL modem, a wireless access point, a router, a base station, and a gateway having a predetermined computing power sufficient for implementing a session negotiation device 120, 121.

A session negotiation device such as 120 and 121 may support a variety of media negotiation protocols known in the art, related art, or developed later including Session Initiation Protocol (SIP), Real-Time Transport Protocol (RTP), Real-Time Streaming Protocol (RTSP), and H.323. The session negotiation device may implement the Session Description Protocol (SDP) as an extension to the media negotiation protocols to negotiate for video streams being compatible with the intended networked devices (for example, the cameras 112 and the displays 114). Such negotiation may involve determination of the communication capability parameters of the networked devices to support exchange of audio, video, and data communications. Examples of communication capability parameters may include, but not limited to, the supported media protocols, supported resolutions, supported bit rates, etc. For example, the session negotiation devices may negotiate a single session with the remotely located displays 114 via the communication device 108 by determining video stream capabilities of the displays 114, so that multiple streams of video data may be sent directly between, for example, the cameras 108 and the displays 112.

In one embodiment, the session negotiation device 120 and 121 may determine predetermined negotiation information associated with the cameras 112 in addition to the communication capability parameters. The determined negotiation information may be communicated to the displays 114 via the communication device 108 for augmenting the media negotiation protocols. Examples of the negotiation information may include, but are not limited to, relative spatial positions and orientations of the physical cameras 112 associated with data streams identified by respective port descriptors, data stream characteristics (for example, media type, transport protocols, formats, etc.) and operational status of the cameras 112 indicating whether the cameras 112 are active or inactive. The spatial position and orientation of the cameras, such as the cameras 112, may be identified in a Cartesian, cylindrical or spherical coordinate system, or any combination thereof. It should be noted that for a digital camera containing a sensor with a two dimensional sensor array, the physical orientation could refer to the window of pixels captured from the sensor in each frame of video. By default, the digital camera might be configured to capture images with a width of 1920 pixels and a height of 1080 pixels at 60 frames per second, corresponding to the standard "landscape mode" or "widescreen" 1080p60 high definition video format. However, during session negotiation, the system may determine that one or more of displays 114 is configured in "portrait mode" with a width of only 1080 pixels and a height of 1920 pixels and may therefore instruct an appropriate number of cameras 112 to send video in the "portrait mode" orientation. This instruction may or may not include a physical rotation of the cameras. As long as the camera's sensor has an array of 1920 pixels by 1920 pixels, a window of either 1920×1080 or 1080×1920 can easily be configured and transmitted. The session negotiation device 120, 121 may determine the relative spatial positions and orientations of the cameras 112 using a variety of techniques and tools known in the art, related art, or developed later.

In one embodiment, the determined negotiation information may be communicated as a new media attribute of the video media descriptor in a Session Description Protocol (SDP) format for the session initiation protocol. For example, a new media attribute "streamgroup" may be implemented to describe the order of an outbound set of video streams by virtue of the relative positions and orientations of the physical cameras 112 at the first location 102. The "streamgroup" attribute may be defined as shown in Equation (1):

$$a=\text{streamgroup:} \\ <\text{order}><\text{mediaport\_1}><\text{mediaport\_2}>\ldots \\ <\text{mediaport\_n}> \quad (1)$$

In Equation (1), 'a' may refer to media attributes; <order> may refer to a string that defines the relative position of the physical cameras; and <mediaport_n> may define a port associated with a video stream corresponding to a camera such as the camera 112-1. The port may be defined in the video media descriptor. Equation (1) may refer to a syntax for implementing the media attribute in the Session Description Protocol. In some embodiments, the session negotiation device may be additionally configured to provide predefined or dynamically defined media definitions including media type (e.g. 'video', 'audio', etc.), transport details and formats. One such exemplary media definition attribute is shown in Equation (2) for 'video' communications:

$$m=\text{video}<\text{port}>/<\text{number of ports}><\text{proto}><\text{fmt}> \quad (2)$$

In Equation 2, <port> may refer to a port defined in the video media descriptor; <number of ports> may refer to a total number of ports being used by a camera such as the camera 112-1 for communicating a video stream; <proto> may refer to a protocol implemented for communicating the video stream; and <fmt> may refer to an extra parameter information. Similar equations may be contemplated for audio and any other type of data streams, or any combination thereof, by a person having skill in the art.

The session negotiation device may implement various predetermined SDP media attributes such as equations (1) and (2) to define a configuration for different resources such as the cameras 112. One camera or stream configuration is shown in Equation (3).

$$m=\text{video } 49170/3 \text{ RTP/AVP } 99 \; xxxx$$

$$a=\text{rtpmap:99 } h264/90000$$

$$a=\text{streamgroup:} xxxx \; L1L2L3 \; 49172 \; 49170 \; 49174 \quad (3)$$

In Equation (3), "m=video 49170/3 RTP/AVP 99" may refer to a session video on port 49170 using RTP Profile for Audio and Video Conferences with minimal Control running over user datagram protocol (UDP). The final 99 may be extra parameter information for RTP/AVP. The another defined attribute "a=streamgroup: L1 L2 L3 49172 49170 49174" may refer to the relative position of the physical cameras 112 as L1, L2, and L3 originating from the media ports 49172, 49170, and 49174 respectively. The described relative positions L1, L2, and L3 may indicate the cameras 112 from a left most position since the cameras 112 may be positioned on top of the displays 110 and facing outwards.

In some embodiments, a session negotiation device 120 may operate in association with various sensors (for example, pressure sensors, proximity sensors, line of sight sensors, etc.) associated with the cameras 112 to determine the negotiation information.

Figure 2:
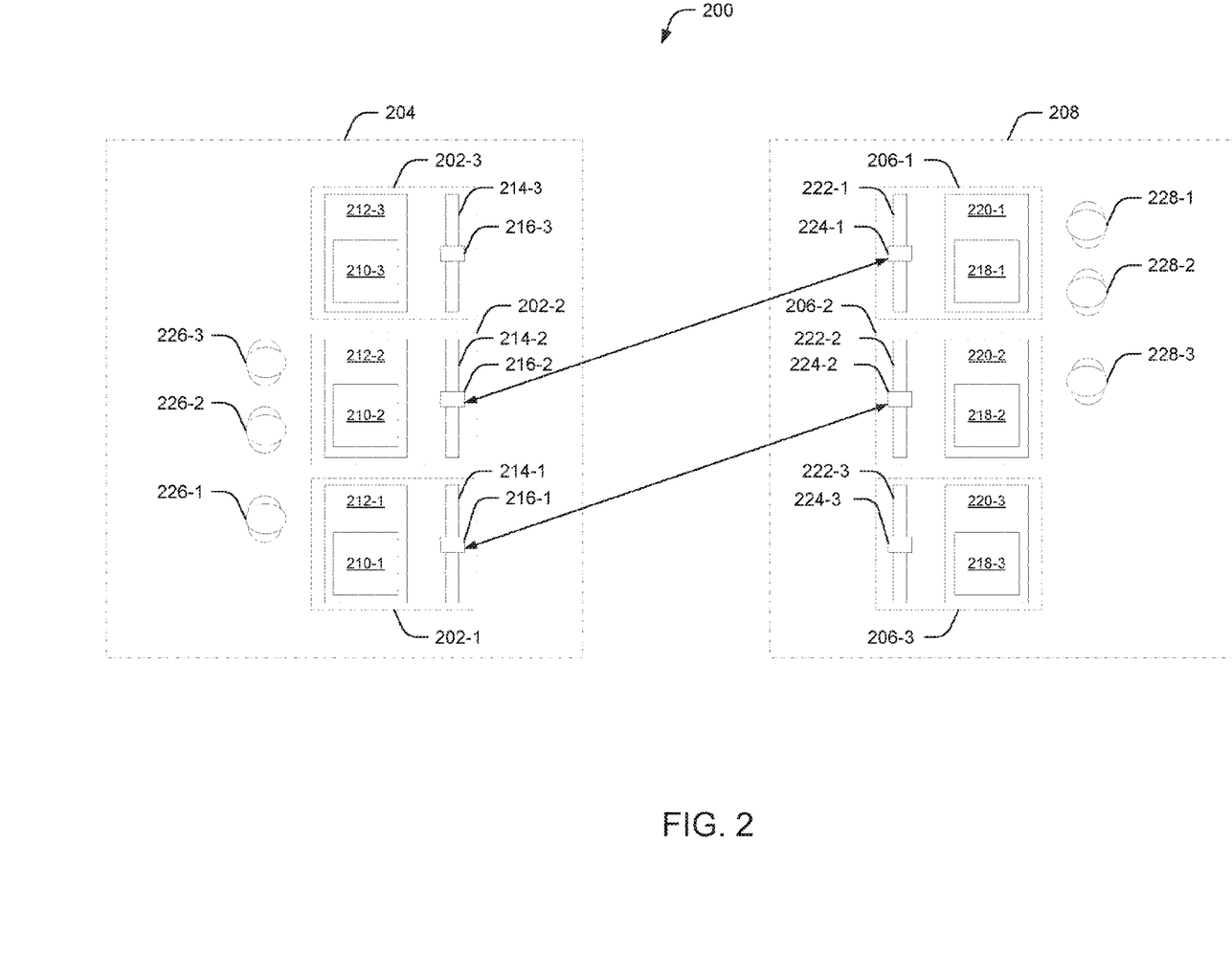
FIG. 2 is a schematic that illustrates the mapping of data streams (for example, video streams) from one location to another location.

FIG. 2. illustrates a session negotiation device that handles mapping of data streams from one location to another location. A network environment 200 may include multiple integrated communication systems such as integrated communication systems 202-1, 202-2, 202-3 (collectively, integrated communication systems 202) at a first location 204 and integrated communication systems 206-1, 206-2, 206-3 (collectively, integrated communication systems 206) at a second location 208.

Each of the integrated communication systems 202, 206 may include a session negotiation device, a communication device, a camera, and a display. For example, at the first location 204, an integrated communication device 202-1 may include a session negotiation device 210-1 integrated with a communication device 212-1, a display 214-1, and a camera 216-1. Similarly, an integrated communication device 206-1 at the second location 208 may include a session negotiation device 218-1 integrated with a communication device 220-1, a display 222-1, and a camera 224-1. Hereinafter for the descriptions of FIG. 2, FIG. 3, and FIG. 4, various elements such as the cameras 216-1, 216-2, 224-1, 224-2; and the displays 214-1, 214-2, 222-1, 222-2 associated with the respective integrated communication systems 202-1, 202-2 and 206-1, 206-2 will be used to explain the concepts. However, one of skill in the art will understand that similar concepts may also be applicable for other devices shown in FIG. 2.

At the first location 204, the cameras 216-1, 216-2, 216-3 (collectively, cameras 216) may be integrated with one or more sensors (not shown) to detect the presence of an object or person within its field of view. The sensors (for example, proximity sensors) may assist to determine the operation status of one or more cameras 216 as being active or inactive based on the presence of the object or the person such as persons 226-1, 226-2, 226-3 (collectively, persons 226) within the field of view of the corresponding cameras such as the cameras 216-1, 216-2. Each of the session negotiation devices (for example, the session negotiation device 210-1) may be configured to use the operational status (i.e., active or inactive) of the cameras for mapping the data streams from only active cameras at one location to one or more displays at a remote location. For example, when the cameras 216-1, 216-2 may be active on the basis of the presence of the persons 226 being detected, the corresponding session negotiation devices 210-1, 210-2 may map data streams from the camera 216-1 and 216-2 at the first location 204 to the displays 222-2 and 222-1 respectively at the second location 208.

Similarly, session negotiation devices (for example, the session negotiation device 218-1) at the second location 208 may map an active local device (for example, the camera 224-1) to one or more devices (for example, a display 214-2) at a remote location when the presence of one or more objects or persons (for example, persons 228-1, 228-2) is detected by that camera.

FIG. 3 illustrates a session negotiation device that may handle mapping of data streams (for example, video streams) from one location to another location, where each of the locations may have different combinations of resources. The session negotiation devices 210-1, 210-2, and 218-1 may be associated with the respective integrated communication systems 202-1, 202-2, 206-1; the respective communication devices 212-1, 212-2, 220-1; the respective displays 214-1, 214-2, 222-1; and the respective cameras 216-1, 216-2, 224-1. At the first location 204, one or more cameras, such as the cameras 216-1 and 216-2, may be active based on detection of persons 226 within the field of view of these cameras. And at the second location 206, camera 222-4 may be active on the detection of persons 228 within its field of view. The session negotiation devices 210-1, 210-2 may map the respective active cameras 216-1, 216-2 at the first location 204 to a single display 222-1 at the second location 208.

A communication device such as the communication device 220-1 at the second location 208 may receive multiple video streams from the mapped active cameras 216-1, 216-2. The communication device 220-1 may combine these data streams to display both the data streams simultaneously on the single display 222-1 using various techniques known in the art, related art, or developed later. In one example, the incoming data streams (for example, video streams) may be tiled into a single image 230, or images of the received data streams may be stitched together to form the single image 230 prior to display.

Figure 4:
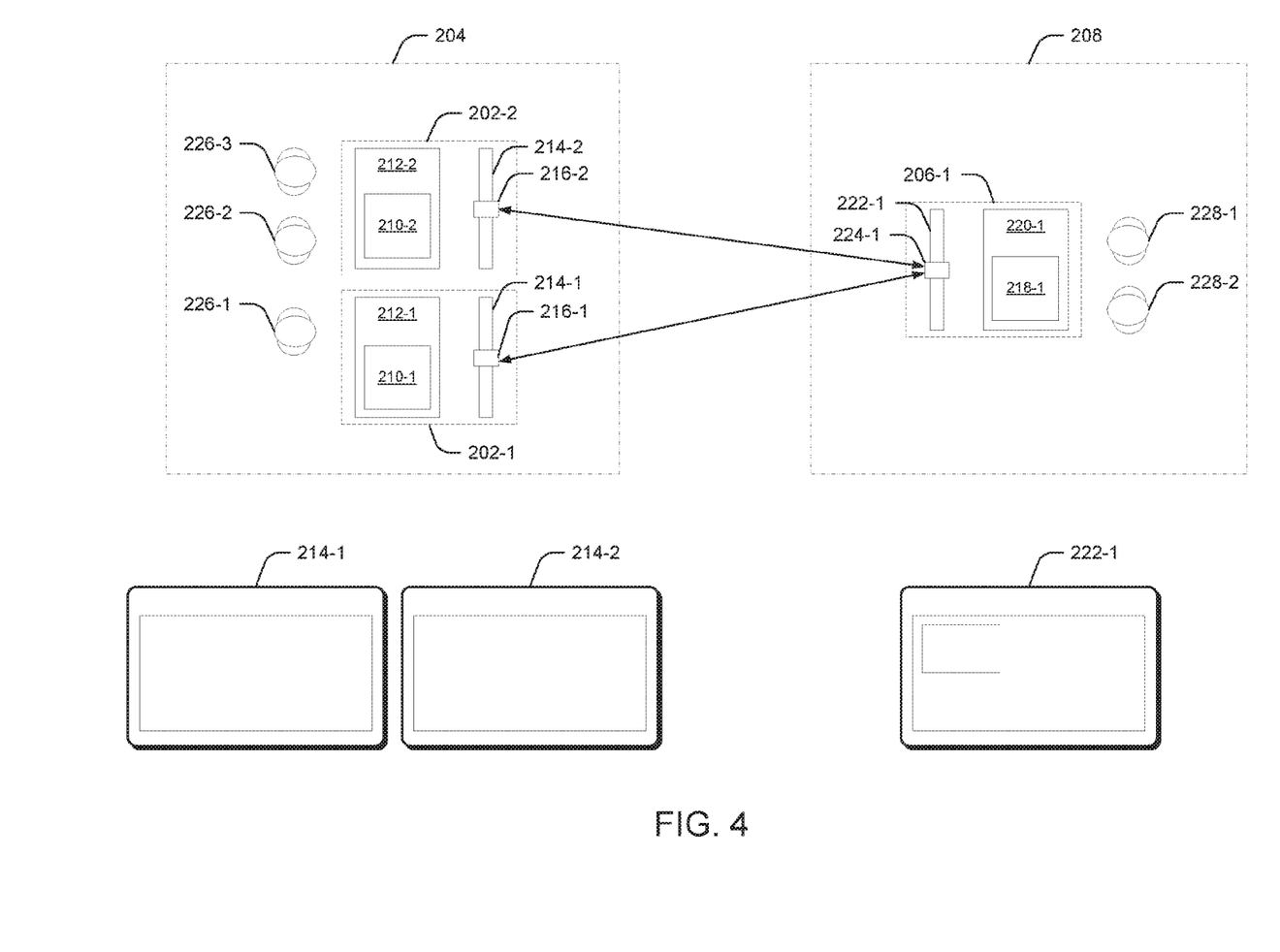
FIG. 4 is a schematic that illustrates the mapping of data streams from one location to another location where each of the locations may have different combinations of resources and in which a source video is presented in an 'overlay mode' on top of another video on a single display at the receiver.

FIG. 4 illustrates another embodiment of the present disclosure. At the first location 204, the integrated communication devices 202-1, 202-2 may include the session negotiation device 210-1, 210-2; the communication devices 212-1, 212-2; the displays 214-1, 214-2; the cameras 216-1, 216-2; and the persons 226-1, 226-2, and 226-3 respectively. Similarly, the integrated communication device 206-1 at the second location 208 may include the session negotiation device 218-1, the communication device 220-1, the display 222-1, and the camera 224-1; and the persons 228-1 and 228-2.

The communication device 220-1 at the second location 208 may lay one of the received video steams over the other received video stream based on the intended application. For instance, a video stream of a sign language interpreter may be overlaid over another video stream of a news reader from a news house. Such overlaying of video streams may be implemented using various techniques known in the art, related art, or developed later.

In some embodiments of the present disclosure, the session negotiation device may assist to dynamically define the layout of video streams on the displays, e.g., a data stream layout based on negotiation and communication capability parameters of the communicating devices with the cameras 216 at the first location 204 and the displays 222 at the second location 208.

In one example, the session negotiation device 210 may be further configured to dynamically define a display layout for the video streams using a predetermined SIP/SDP media attribute associated with each stream. One such exemplary media attribute is shown in Equation (4) below:

$$a=\text{streamdesc:<port><type><description>} \quad (4)$$

In Equation (4), <port> may identify the ports associated with the media stream; <type> may identify whether the stream is required or optional; <description> may provide a textual description of the stream.

The session negotiation device 210 may use Equation (4) for defining a media attribute to display the streams in a preset layout. One example of the defined media configuration using the media attribute of Equation (4) is shown in Equation (5) below:

$$a=\text{streamdesc:49170 optional "ASL interpreter"}$$

$$a=\text{streamdesc:49172 required "conference room camera 1"}$$

$$a=\text{streamdesc:49174 required "conference room camera 2"} \quad (5)$$

In some embodiments, such stream negotiation using Equation (4) may be extended to include data streams, which may be designated as "optional", designated with a predetermined content type, or are based on an intended application. For example, in Equation (5), the media attribute "a=streamdesc:49170 optional "ASL interpreter" may refer to a video stream corresponding to an ASL interpreter from the port 49170 may be optionally displayed by the session negotiation device. For instance, and as shown in FIG. 4, the session negotiation device 210 may negotiate the video streams of a sign language interpreter to be displayed in an 'overlay mode' only if a deaf person is present in the vicinity of a display such as the display 222-1. The 'overlay mode' may refer to embedding of a data stream within another data stream for display.

Such negotiated device topology implemented by the session negotiation device may be extended to various applications. In some embodiments, this topology may be extensible to a multi-party video conferencing environment using either a centralized or a distributed conferencing methodology, where the video streams may be handled in continuous presence or voice switched modes. For example, in a centralized multipoint control unit (MCU) paradigm, the MCU may receive potentially multiple video streams from each endpoint (for example, a camera) at a remote location. The MCU may use the negotiated camera topology implemented by the session negotiation device to map incoming video streams to various outbound stream topologies (for example, tiled, overlaid, etc.) on connected or networked devices. The negotiated device topology may be implemented in a distributed multi-point conference environment in the similar manner.

In some other embodiments, the negotiated device topology may be implemented by the session negotiated device for "video wall" applications in which a single stream of video may be displayed across multiple displays, which may be logically grouped as a single display.

The negotiated device topology may be completely flexible with respect to (1) compositions and scalability of video stream layers and display windows; and (2) content distribution and a single output of video streams being displayed across multiple devices for final display. Additionally, the negotiated device topology implemented by the session negotiated device may not be limited to or by a grid layout for display and pixel density for each display receiving the augmented, negotiated video streams.

Figure 5:
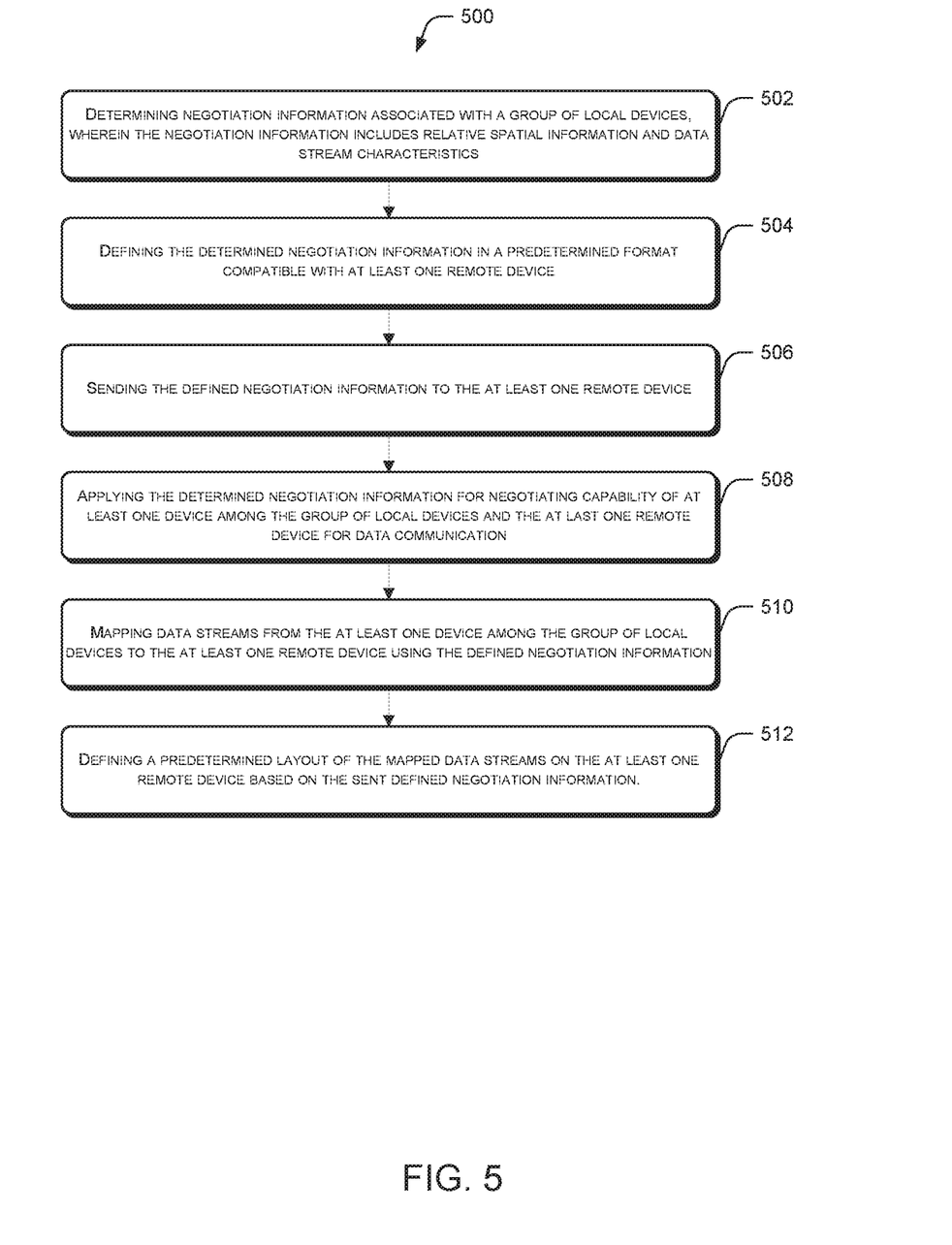
FIG. 5 is a block diagram illustrating a method for implementing a session negotiation device.

FIG. 5 illustrates a method for implementing the session negotiation device. At step 502, negotiation information associated with a group of local devices is determined. In one embodiment, the session negotiation device may determine negotiation information associated with a group of local devices such as cameras, displays. The negotiation information may include, but not limited to, spatial information (for example, position, orientation, etc.) of the group of local devices relative to each other, characteristics of data streams (for example, media types, transport protocols, formats, associated media port, etc.) associated with each of the local devices, etc. The session negotiation device may determine the negotiation information using various sensors known in the art, related art, or developed later including pressure sensors, proximity sensors, and line of sight sensors.

In some embodiments, the negotiation information may include operational status of each of the local devices in the group. The session negotiation device may determine whether any of the local devices is active or inactive by using various sensors such as those mentioned above or field recognition by the camera. For example, a camera may be active if a predefined object or person is within the field of view of the camera or any associated sensor.

At step 504, the determined negotiation information is defined in a predetermined format compatible with a remote device. In one embodiment, the session negotiation device may support a variety of media negotiation protocols known in the art, related art, or developed later including SIP, RTP, and H.323. The session negotiation device may define various predetermined media attributes in one or more SDP formats as an extension to the media negotiation protocols. The predetermined media attributes such as those discussed above in Equation (1), (2), and (4) may define the determined negotiated information for data streams associated with each of the local devices. Equation (1) may describe the order of an outbound set of data streams based on the relative spatial information of each of the local devices. Equation (2) may describe media definitions including media type (e.g. 'video', 'audio', etc.), transport details and formats for each data stream. Equation (4) may describe display layout for the data streams. The formats of the predetermined media attributes may be compatible with a remote device intended for being used for communication.

At step 506, the defined negotiation information is sent to a remote device. Once the media attributes are defined in a compatible protocol such as SDP, the session negotiation device may send the media attributes (such as those discussed with respect to the Equations (1), (2), and (4)) to a remote device in compatible formats for establishing a data communication channel.

At step 508, the determined negotiation information is applied for negotiating the capabilities of a device among the group of local devices and a remote device for data communication. The session negotiation device may apply the determined negotiation information in addition the communication capability parameters to negotiate capability of a device among the group of local devices (e.g., cameras) and a remote device (e.g., displays) for data communication. Minimum acceptable characteristics of the communicating devices are determined during negotiation based on which the communication devices may support one or more data streams such as video streams, audio streams, etc.

At step 510, data streams from a device in the group of local devices is mapped to a remote device based on the defined negotiation information. The session negotiation device may map a local device in the group of local devices to a remote device based on the determined negotiation information associated with each of the devices in the group of local devices. The session negotiation device may use the defined negotiation information sent to a remote device for such mapping. For example, the session negotiation device may map data streams from a local device to a remote device using one or more Equations (1), (2), and (4) when the local device is determined to be active.

At step 512, a predetermined layout of the mapped data streams is defined on a remote device based on the sent defined negotiation information. The session negotiation device may predefine or dynamically define a layout for the data streams received on a remote device using the communicated media attributes of, for example, Equation (4). Based on the defined negotiation information in Equation (4), a remote device may display the received data streams such as the incoming video streams as tiled into a single image, or the underlying images being stitched together to form the single image, may be displayed in the 'overlay' mode layout.

The session negotiation device may automatically discover the camera/display capabilities and configuration of a remote video conferencing system and automatically map the camera sources to the target displays without any prior knowledge of a remote room using the defined negotiation information. Hence, the session negotiation device may reduce operating and administrative costs. Only the phone number/address of the remote endpoint, such as a communication device, may be required to establish a conferencing session. No prior knowledge of the remote conferencing system configuration may be required. Further, since the negotiation information of the local devices provides in-depth and automated negotiation between the communicating devices, the session initiation device provides better performance, increased durability, and improved flexibility. Additionally, implementation of the session negotiation device has a simpler configuration and reduced system hardware cost since, the local end-point only need be configured when the system is installed using a single hardware platform.

While the present disclosure has been described herein with respect to certain illustrated and described embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor. The disclosure of the present invention is

We claim the following invention:

1. A system for negotiating video camera and display capabilities in a video conferencing environment, comprising:
   a local camera capturing a data stream upon being active;
   a local communication device in communication with said local camera and the remote display; and
   a session negotiation device in communication with said communication device, said session negotiation device further comprises a processor, memory, and a storage, wherein said processor executes a sequence of computer programmable software instructions comprising:
      determining negotiation information associated with said local camera, wherein the determined negotiation information comprises relative spatial information and data stream characteristics;
      defining said determined negotiation information in a predetermined format compatible with the remote display;
      applying said determined negotiation information for negotiating capability of said local camera and the remote display for data communication;
      sending said determined negotiation information to the remote display;
      mapping data streams from said local camera to the remote display using said determined negotiation information; and
      defining a predetermined layout of said mapped data streams on the remote display based on said determined negotiation information.

2. The claim according to claim 1, wherein said determined negotiation information is defined as one or more predetermined media attributes in a session description protocol format wherein said predetermined media attributes further comprises:
   a first port identifier associated with the data stream and a parameter that defines relative position of said local camera providing the data stream; and
   a second port identifier associated with the data stream, a type identifier for the data stream, and a parameter providing the description of the data stream.

3. The claim according to claim 1, wherein the data stream is a video data stream.

4. The claim according to claim 1, wherein the relative spatial information comprises a spatial position and orientation.

5. The claim according to claim 1, wherein the data stream characteristics comprise one or more media types, transport protocols, formats, and associated media ports.

6. A method to manufacture a system for negotiating video camera and display capabilities in a video conferencing environment, comprising:
   providing a local camera capturing a data stream upon being active;
   providing a local communication device in communication with said local camera and the remote display; and
   providing a session negotiation device in communication with said communication device, said session negotiation device further comprises a processor, memory, and a storage, wherein said processor executes a sequence of computer programmable software instructions comprising:
      determining negotiation information associated with said local camera, wherein the determined negotiation information comprises relative spatial information and data stream characteristics;
      defining said determined negotiation information in a predetermined format compatible with the remote display;
      applying said determined negotiation information for negotiating capability of said local camera and the remote display for data communication;
      sending said determined negotiation information to the remote display;
      mapping data streams from said local camera to the remote display using said determined negotiation information; and
      defining a predetermined layout of said mapped data streams on the remote display based on said determined negotiation information.

7. The claim according to claim 6, wherein said determined negotiation information is defined as one or more predetermined media attributes in a session description protocol format wherein said predetermined media attributes further comprises:
   a first port identifier associated with the data stream and a parameter that defines relative position of said local camera providing the data stream; and
   a second port identifier associated with the data stream, a type identifier for the data stream, and a parameter providing the description of the data stream.

8. The claim according to claim 6, wherein the data stream is a video data stream.

9. The claim according to claim 6, wherein the relative spatial information comprises a spatial position and orientation.

10. The claim according to claim 6, wherein the data stream characteristics comprise one or more media types, transport protocols, formats, and associated media ports.

11. A method to use a system for negotiating video camera and display capabilities in a video conferencing environment, comprising:
   capturing a data stream with a local camera upon being active;
   communicating between a local communication device and said local camera and the remote display; and
   communicating between a session negotiation device with said communication device, said session negotiation device further comprises a processor, memory, and a storage, wherein said processor executes a sequence of computer programmable software instructions comprising:
      determining determined negotiation information associated with said local camera, wherein the determined negotiation information comprises relative spatial information and data stream characteristics;
      defining said determined negotiation information in a predetermined format compatible with the remote display;
      applying said determined negotiation information for negotiating capability of said local camera and the remote display for data communication;
      sending said determined negotiation information to the remote display;
      mapping data streams from said local camera to the remote display using said determined negotiation information; and
      defining a predetermined layout of said mapped data streams on the remote display based on said determined negotiation information.

12. The claim according to claim 11, wherein said determined negotiation information is defined as one or more predetermined media attributes in a session description protocol format wherein said predetermined media attributes further comprises:
   a first port identifier associated with the data stream and a parameter that defines relative position of said local camera providing the data stream; and
   a second port identifier associated with the data stream, a type identifier for the data stream, and a parameter providing the description of the data stream.

13. The claim according to claim 11, wherein the data stream is a video data stream.

14. The claim according to claim 11, wherein the relative spatial information comprises a spatial position and orientation.

15. The claim according to claim 11, wherein the data stream characteristics comprise one or more media types, transport protocols, formats, and associated media ports.

16. A non-transitory program storage device readable by a computing device that tangibly embodies a program of instructions executable by the computing device to perform a method to use a system for negotiating video camera and display capabilities in a video conferencing environment, comprising:
   capturing a data stream with a local camera upon being active;
   communicating between a local communication device and said local camera and the remote display; and
   communicating between a session negotiation device with said communication device, said session negotiation device further comprises a processor, memory, and a storage, wherein said processor executes a sequence of computer programmable software instructions comprising:
      determining determined negotiation information associated with said local camera, wherein the determined negotiation information comprises relative spatial information and data stream characteristics;
      defining said determined negotiation information in a predetermined format compatible with the remote display;
      applying said determined negotiation information for negotiating capability of said local camera and the remote display for data communication;
      sending said determined negotiation information to the remote display;
      mapping data streams from said local camera to the remote display using said determined negotiation information; and
      defining a predetermined layout of said mapped data streams on the remote display based on said determined negotiation information.

17. The claim according to claim 16, wherein said determined negotiation information is defined as one or more predetermined media attributes in a session description protocol format wherein said predetermined media attributes further comprises:
   a first port identifier associated with the data stream and a parameter that defines relative position of said local camera providing the data stream; and
   a second port identifier associated with the data stream, a type identifier for the data stream, and a parameter providing the description of the data stream.

18. The claim according to claim 16, wherein the data stream is a video data stream.

19. The claim according to claim 16, wherein the relative spatial information comprises a spatial position and orientation.

20. The claim according to claim 16, wherein the data stream characteristics comprise one or more media types, transport protocols, formats, and associated media ports.

* * * * *